United States Patent
Bencivenni et al.

(10) Patent No.: US 12,072,457 B2
(45) Date of Patent: Aug. 27, 2024

(54) PLATE ELECTRODE WITH MODULABLE SURFACE RESISTIVITY AND DETECTORS BASED THEREOF

(71) Applicant: INFN—Istituto Nazionale di Fisica Nucleare, Frascati (IT)

(72) Inventors: Giovanni Bencivenni, Frascati (IT); Marco Poli Lener, Frascati (IT); Gianfranco Morello, Frascati (IT)

(73) Assignee: INFN—Istituto Nazionale di Fisica Nucleare, Frascati (IT)

( * ) Notice: Subject to any disclaimer, the term of this patent is extended or adjusted under 35 U.S.C. 154(b) by 106 days.

(21) Appl. No.: 17/797,026

(22) PCT Filed: Feb. 8, 2021

(86) PCT No.: PCT/IB2021/050995
§ 371 (c)(1),
(2) Date: Aug. 2, 2022

(87) PCT Pub. No.: WO2021/156837
PCT Pub. Date: Aug. 12, 2021

(65) Prior Publication Data
US 2023/0341570 A1  Oct. 26, 2023

(30) Foreign Application Priority Data
Feb. 6, 2020 (IT) .................. 102020000002359

(51) Int. Cl.
*G01T 1/29* (2006.01)

(52) U.S. Cl.
CPC ................. *G01T 1/2935* (2013.01)

(58) Field of Classification Search
CPC ..................................... G01T 1/2935
See application file for complete search history.

(56) References Cited

FOREIGN PATENT DOCUMENTS

| | | | | |
|---|---|---|---|---|
| CN | 109148253 A | * | 1/2019 | ........... G01N 27/125 |
| CN | 109709149 A | | 5/2019 | |
| DE | 2430152 A1 | * | 1/1976 | ............... H01J 47/00 |
| DE | 102010013419 A1 | * | 10/2011 | ................ G01T 1/26 |
| RU | 200205 U1 | * | 10/2020 | ................ G01T 1/18 |

OTHER PUBLICATIONS

G. Bencivenni et al., "The Micro-RWell Layouts for High Particle Rate." ARXIV. Org., Cornell University Library, Mar. 26, 2019.
Nema Standards Publication No. LI Jan. 1998. Industrial Laminating Thermosetting Products. National Electrical Manufacturers Association, 1998.
Composites. VonRoll. Von Roll USA, Inc., 200 Von Roll Drive, Schenectady, NY 12306.
(Continued)

*Primary Examiner* — David P Porta
*Assistant Examiner* — Fani Polyzos Boosalis
(74) *Attorney, Agent, or Firm* — Blank Rome LLP

(57) ABSTRACT

Resistive plate electrode (110, 120; 210, 220; 310, 320) with modulable surface resistivity comprising a supporting plate (130; 230; 330) coupled to a layer (131; 231; 331) of polymer material on which a DLC layer (135; 235; 335) is deposited that is connected to a connection assembly (145, 245, 345) configured to be connected to a high voltage power supply.

15 Claims, 3 Drawing Sheets

(56) References Cited

OTHER PUBLICATIONS

M. Anelli et al., "Glass Electrode Spark Counters." Nuclear Instruments and Methods in Physics Research, vol. A300, pp. 572-574, 1991.
R. Cardarelli et al., "Avalanche and Streamer Mode Operation of Resistive Plate Chambers." Nuclear Instruments and Methods in Physics Research, vol. A382. pp. 470-474, 1996.
R. Santonico et al., "Development of Resistive Plate Counters." Nuclear Instruments and Methods, vol. 187, pp. 377-380, 1981.
V.V. Parkhomchuck et al., "A Spark Counter with Large Area." Nuclear Instruments and Methods, vol. 93, pp. 269-270, 1971.

* cited by examiner

PLATE ELECTRODE WITH MODULABLE SURFACE RESISTIVITY AND DETECTORS BASED THEREOF

The present invention refers to a resistive plate electrode with modulable surface resistivity and a related high time resolution gas detector with resistive plate electrodes with modulable surface resistivity for high-rate applications. The resistive plate electrode with modulable surface resistivity and the gas detectors based thereon are able to operate at radiation flux higher or equal to 10 kHz/cm$^2$ with fast response time, radiation robustness, simplicity manufacturing and cost effective.

Although the presented invention is mainly oriented towards High Energy Physics experiment applications, it may be applied to other fields and other applications wherein it needs high resolution and high area trackers, such as for example digital sampling calorimetry, Neutron and X-ray imaging diagnostics, volcanology and archaeology, and muon and neutron portals for national safety.

The Resistive Plate Counter, RPCs, are gas detectors with resistive parallel plate electrodes, typically having thickness from 1 to 2 mm (millimeter) and volume resistivity ranging from $10^{11}$ to $10^{12}$ Ω·cm (Ohm·centimeter), therefore they are configured for application at particle flux on the order of 1 kHz/cm$^2$. The gap of gas is typically of 2 mm. The gas mixtures are basically of two types: one for detector functioning in streamer discharge regime (Ar/iso-butane/freon with high ratio of quencher gas, i.e. isobutane); the other for detector functioning in avalanche discharge regime (Freon/iso-butane/SF$_6$, with low quantity of iso-butane and traces of SF$_6$ for streamer suppression). The detector, operated at very high voltage and thus at very high electric field, provides with high time resolution on the order of at least 1 nanosecond, on detector size on the order of square meter at low cost. Historically RPCs with Bakelite electrodes have been manufactured (see the paper of R. Santonico e R. Cardarelli. "Development of resistive plate counters.", Nucl. Instr. and Meth., 187:377-380, 1981), while at the beginning of the '90s float glass, i.e. commercial glass, electrode solutions have been implemented, see for example the paper of M. Anelli, G. Bencivenni et al., "Glass electrode spark counters", Nucl. Instr. and Meth. A300 (1991) 572-574.

Document of G. Bencivenni et al., "The micro-RWELL layouts for high particle rate", ARXIV.org, Cornell University Library, 201 Online Library Cornell University Ithaca, NY 14853, 26 Mar. 2019 (2019 Mar. 26) XP081269622, discloses a micro-RWELL, or μ-RWELL, detector wherein the active part of the amplification stage is made of a polymeric material foil whose one side is coated with copper on which a matrix of blind holes, called WELLs, is photo-lithographed. Into such WELLs, in presence of gas, the process of primary ionization multiplication occurs, i.e. the amplification stage, while the resistive layer placed on the other side of the polymeric layer of the resistive plate electrode is connected to ground of the high voltage power supply.

Document CN 109 709 149 A (Univ. Science & Technology China) 3 May 2019 (2019 May 3) disclosed a full-resistive version of the micro-RWELL detector above mentioned.

One of the biggest challenges that has lasted for decades is the improvement of the detector rate capability, that is the ability of the detector to operate in a stable manner, that is, maintaining its performance, at a given radiation flux (rate) (e.g. see papers of: V. Parchomchuk et al., "A spark counter with large area", Nucl. Instr. and Meth., 93:269-276, 1971; R. Santonico and R. Cardarelli, "Development of resistive plate counters", Nucl. Instr. and Meth., 187: 377-380, 1981; R. Cardarelli, R. Santonico, and V. Makeev, "Avalanche and streamer mode operation of resistive plate chambers.", Nucl. Instr. Meth., A 382:470-474, 1996).

There are rate capabilities from tens of Hz/cm$^2$ (Hertz/centimeter$^2$), for RPCs operated in streamer regime, to hundreds of Hz/cm$^2$, for Pestov Counters (essentially based on semiconductive glasses with very low volume resistivity, from $10^9$ at $10^{10}$ Ω·cm), up to about a few kHz/cm$^2$, for RPCs operating in the avalanche regime.

The resistive nature of the electrodes, a fundamental characteristic of the detector whose stability it guarantees, is also the major cause of limitation of the detector rate capability. The recovery time τ of the electric field around the zone where particle pass through linearly depends on the product R×C, where R is related to the volumetric resistivity of the electrode and C to the capacitance thereof (and of the gaseous gap).

The strategies for the improvement of the rate capability in recent decades have been mainly focused on two ways: 1) the search for gas mixtures that have allowed the transition from the streamer to the avalanche regime which, with the same resistivity, provides a considerable gain in rate capability, due to the considerable reduction of the charge generated by the passage of the ionizing particles; 2) the search for materials with low volume resistivity to be used as planar electrodes.

The first way obviously required the creation of increasingly sophisticated and fast pre-amplification electronics (R. Cardarelli et al., "Avalanche and streamer mode operation of resistive plate chambers", Nucl. Instr. Meth., A 382:470-474, 1996). The second way does not seem easy to follow, for example Pestov-type semiconductive glasses are not easy to industrialize. In the '90s, the inventor of this invention made prototypes of semiconductive glass with a volume resistivity of the order of $10^{10}$ ·cm in collaboration with the "Stazione Sperimentale del vetro", Experimental Glass Station, (SSV) of Murano, obtaining interesting results, but which would have required considerable investments to achieve industrial production.

It is an object of this invention, therefore, to produce plate electrode gas detectors configurated to operate at radiation fluxes greater than 10 kHz/cm$^2$, which are efficient, simple to make and inexpensive and which do not require a sophisticated readout electronic.

It is one specific object of the present invention a resistive plate electrode comprising a supporting plate coupled to a layer of polymer material on which a DLC, Diamond Like Carbon, layer is deposited that is connected to a connection assembly configured to be connected to a high voltage power supply, wherein the resistive plate electrode has a surface resistivity that depends on varying values of one or more deposition parameters of the DLC layer.

According to a further aspect of the invention, said surface resistive plate electrode may have a resistivity ranging from 0.1 to 10 GΩ/square According to an additional aspect of the invention, said layer of polymer material may comprise a polyimide foil.

According to a further aspect of the invention, said supporting plate may comprise glass fibres reinforced epoxy resin.

According to an additional aspect of the invention, said connection assembly may comprise conductive elements that are connected to at least one perimetral edge of the DLC layer.

According to another aspect of the invention, said connection assembly may comprise a conductive grid made on a free surface of the DLC layer.

According to a further aspect of the invention, said conductive grid may be an array of conductive strips that are parallel each other.

According to an additional aspect of the invention, said parallel conductive strips may have a width (l) in the range of 0.05 mm-0.2 mm and a pitch (p) in the range of centimetre.

According to another aspect of the invention, said DLC layer may be connected to the connection assembly by means of a matrix of metalized vias passing through the supporting plate and the layer of polyimide, the connection assembly comprising conductive elements located on the surface of supporting plate that is opposed to the surface on which the DLC layer is deposited.

According to a further aspect of the invention, said resistive plate electrode with modulable surface resistivity may comprise an additional layer of polymer material on which an additional DLC layer is deposited that is connected to said DLC layer by means of an additional matrix of vias It is another specific subject-matter of the present invention a resistive plate electrode gas detector comprising a first resistive plate electrode and a second resistive plate electrode that are configured to be biased through an high voltage power supply and each one is configured to be connected to a front-end electronics, wherein the first and the second resistive plate electrode are coupled parallel each other so that the resistive surfaces of each of them are faced each other defining a gas gap configured to contain gas, wherein the first and the second resistive plate electrode are each one a resistive plate electrode comprising a supporting plate coupled to a layer of polymer material on which a DLC layer is deposited that is connected to a connection assembly configured to be connected to a high voltage power supply, wherein the resistive plate electrode has a surface resistivity that is modulable on varying values of one or more deposition parameters of the DLC layer.

According to another aspect of the invention, said resistive plate electrode gas detector may comprise insulating spacers inside the gap configured to preserve the scale of the gas gap and avoid discharge occurrences inside the gas gap.

According to a further aspect of the invention, each of said first and second resistive plate electrode may be coupled to a readout printed circuit board on which readout conductive strips connected to the front-end electronics are fixed.

According to an additional aspect of the invention, said parallel conductive strips may have a pitch ranging from 5 to 10 cm.

According to another aspect of the invention, said supporting plate may be semi-rigid, in other words flexible.

According to a further aspect of the invention, said supporting plate may comprise comprises plastic materials.

The main advantage of the detector according to the invention is to be able to operate at radiation fluxes greater than or equal to 10 kHz/cm$^2$, due to the easily modulated surface resistivity. In fact, the operation of the detector according to the present invention is based on the surface resistivity of its resistive plate electrodes. By varying the values of one or more deposition parameters of the DLC resistive layer of the resistive plate electrodes, it is possible to obtain with good accuracy (within +/−30%) a surface resistivity in a range of values of the order of $10^8$ Ohm/square÷$10^{10}$ Ohm/square.

On the contrary, the operation of known resistive plate electrode detectors is based on the volume resistivity of the resistive plate electrodes. This volume resistivity depends on the constituent material of the resistive plate electrode itself and is not easily variable. It varies in a range of values of the order of $10^{11}$ Ohm·cm÷$10^{10}$ Ohm·cm, so the resistive plate electrode detectors are suitable for applications with particle fluxes on the order of 1 kHz/cm$^2$.

In other words, the RPC electrode according to the present invention is based on a completely different concept from that used in traditional RPCs. The known art RPC electrode, typically in Bakelite or glass characterized by volume resistivity that is not easily modulable, in the new detector according to the present invention is replaced by a surface resistivity plate electrode made by industrial deposition techniques on flexible or semi-rigid supports. By modulable surface resistivity we mean a surface resistivity which varies as the values of the deposition parameters vary.

By means of standard techniques it is possible, in fact, to manufacture very thin layers (from 0.1 to 0.5 μm, micron) of diamond-like carbon, also known as DLC, with surface resistivity that can be varied over a wide range of values, that is from 0.01 to 10 GΩ/square, varying the values of the deposition parameters, on large surfaces. On an industrial scale, DLC depositions were carried out on surfaces of about 60×100 cm$^2$ by the Japanese company, Be-Sputter Ltd of Kobe. Depositions of DLC+Cu were also carried out on small and medium surfaces, i.e. from 20×20 cm$^2$ up to 20×100 cm$^2$, as an experiment by a Chinese research institute, the USTC of Hefei as described in Y. Zhou et al., "News on DLC Coatings", contribution to the RD51 Collaboration Meeting and the topical workshop on MPGD Stability, 18-22 Jun. 2018, Technical University of Munich—Munich, Germany. (https://indoco.cern.ch/event/709670/timetable/\#20180622.detailed).

A further important advantage of the detector according to the invention is that it is manufactured by means of Sequential Build Up procedures, SBU, that are standard in the printed circuit industry, without requiring chemical etching procedures of the flexible component (typically polyimide), which represents one of the current greater limitations of the technological transfer of the construction processes of Micro-Pattern-Gaseous-Detectors (MPGD) such as GEM and its derivatives (as well as μ-RWELL). In fact, these detectors currently require specific non-standard processing in specialized laboratories such as those of CERN (European Center for Nuclear Research).

This feature makes the present invention extremely interesting because it allows the mass production at low cost of a detector characterized by high temporal performance for large detection surfaces (typical of future generation muon detection equipment—FCC-ee, CepC—of the order of thousands of m$^2$) in an environment with high radiation fluxes.

In the RPCs, the electrons generated in the avalanche move towards the resistive anode, while the positive ions move towards the cathode which in principle could also be metallic. The electrons, neutralizing on the high resistance anode, create a localized voltage drop, extinguishing the electric field around the position of the avalanche. The voltage drop is recovered with a time constant τ which depends on the RC of the resistive detector. Positive ions can extract electrons from the cathode which could multiply triggering the so-called after pulses or a continuous discharge if the local electric field were sufficiently high. To operate the detector in safe mode, the characteristic time constant r should be much larger than the time T$^+$ for collecting positive ions on the cathode.

From this condition the person skilled in the art can arrive to the order of magnitude of the resistance to be experienced by the current pulse produced in the detector upon the passage of the ionizing particle. In other words, this resistance must be in the range from 0.1 to 10 G$\Omega$, optionally in the range from 0.5 to 10 G$\Omega$, more optionally equal to 1 G$\Omega$.

The present invention will be now described, by way of illustration and not by way of limitation, according to its preferred embodiments, by particularly referring to the Figures of the annexed drawings, in which.

In the Figures, identical reference numerals will be used for alike elements.

Figure 1:
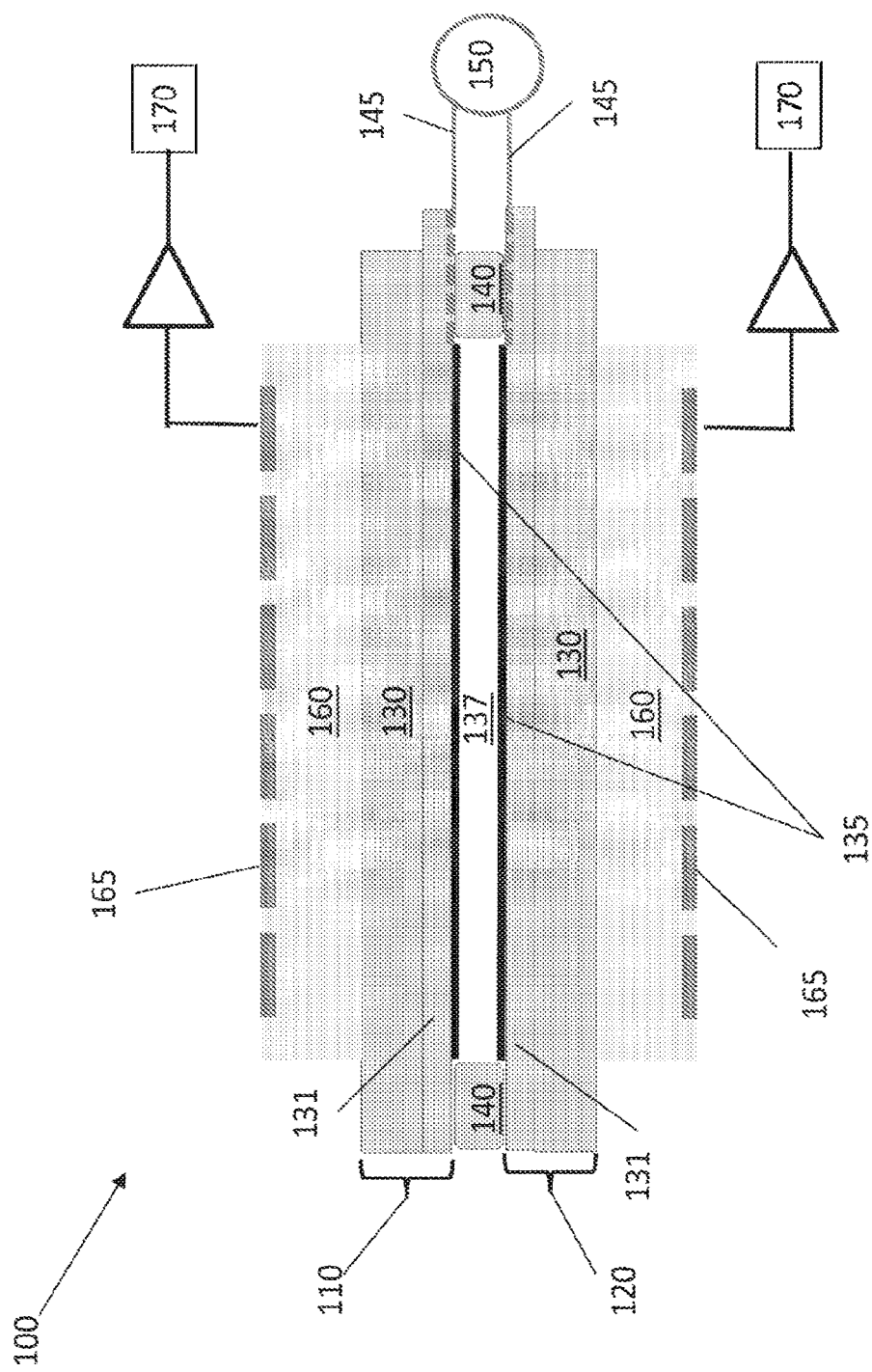
FIG. 1 shows a sectional structure of a first embodiment of a plate electrode detector with modulable surface resistivity according to the invention.

With reference to FIG. 1, a first embodiment of the detector according to the invention is described below, first embodiment is based on single resistive layer electrodes with modulable surface resistivity ranging from 0.1 to 10 G$\Omega$/square, optionally ranging from 0.5 to 10 G$\Omega$/square, more optionally equal to 1 G$\Omega$/square as better described below.

The detector 100 of FIG. 1 comprises a first resistive plate electrode 110 and a second resistive plate electrode 120 each comprising a glass fibre reinforced epoxy resin supporting plate 130, such as for example Vetronite® FR4, coupled by adhesive to a layer 131 of polymer material, such as for example polyimide. Vetronite® is a trademark for laminates made of glass fibres bonding with an appropriate resin system sold by Von Roll Isola France SA company, while FR4 is a standard defined by the NEMA (National Electrical Manufacturers Association) in NEMA STANDARDS PUBLICATION NO. Li 1-1998 for a glass-reinforced epoxy resin laminate material. In particular, "FR" stands for flame retardant, and FR-4 indicates that the flammability of such material is in compliance with the UL (Underwriters Laboratories) standard 94V-0.

A data sheet for Vetronite® FR4 is currently available at https://pdf.directindustry.com/pdf/von-roll/composites/12485-350035.html and at https://www.aikolon.fi/site/assets/files/2173/composites_en.pdf and is hereby incorporated by reference in its entirety.

A modulable resistivity DLC layer 135 is deposited on the free side of the layer 131, i.e., on the face opposite the supporting plate 130, thus making the respective electrode (110 or 120) a resistive plate electrode with modulable surface resistivity. In other words, the surface resistivity of the resistive plate electrodes is given by the resistivity of their respective DLC layers.

In other embodiments of the resistive plate electrode according to the invention, the supporting plate 130 is coupled to the polyimide layer 131 using techniques other than gluing.

The first and second resistive plate electrodes 110, 120 with modulable surface resistivity are coupled parallel to each other on a rigid support frame 140 placed at detector perimeter, so that the surfaces of the respective DLC layers 135, which do not face the respective supporting plates 130 (i.e. the supporting plates 130 of the respective resistive plate electrode 110 or 120), face each other and are kept at a fixed distance forming a gap 137 configured to contain gas.

In the preferred embodiment of the invention, the support frame 140 comprises glass fibre reinforced epoxy resin, such as for example Vetronite® FR4.

The surfaces of the DLC layers 135 which face the gas gap are suitably biased by means of a connection assembly 145 to connect to a high voltage power supply 150.

When the detector 100 is in operation, the process of multiplying the primary ionization, produced by the passage of an ionizing particle, takes place in the gas gap 137 delimited by the layers 135 of DLC of the resistive plate electrodes 110, 120 connected to the connection assembly 145 at the high voltage power supply 150. In other words, the resistive plate electrodes with modulable surface resistivity 110, 120 are the active part of the amplification stage of the detector 100.

The connection assembly 145 is perimeter, i.e., it comprises conductive elements which are connected to at least one perimeter edge of the DLC layer 135 of each first and second resistive plate electrodes 110, 120 with modulable surface resistivity. In other words, the connection assembly 145 is positioned at the edges of active areas of the detector 100. The connection assembly 145 operates as a system for evacuating the current generated by the passage of the radiation in the gas gap 137.

As above mentioned, it can be shown that for the surface resistivity of the DLC layer which guarantees the proper functioning of the detector 100, intended as a compromise between the effective self-quenching of discharges (detector stability) and an acceptable rate capability, of the order of about 1 kHz/cm$^2$, it must be such that the resistance seen by the current impulse generated by the passage of the ionizing particle in the gas gap 137 is preferably of the order of 1 G$\Omega$. Much lower surface resistivities, for example less than 100 M$\Omega$, would lead to instability of the detector (which would go into continuous discharge), while higher values, for example 10 G$\Omega$, would necessarily lead to a more limited rate capability.

The surface of the supporting plate 130 which is not coated by the DLC layer 135 of each resistive plate electrode 110, 120 is coupled to a readout printed circuit 160 on which readout conductive strips 165 connected to the front-end electronics 170 are fixed.

In other embodiments of the detector according to the invention, the supporting plate 130 can itself operate as an external readout electrode, whereby the conductive readout strips 165 are fixed directly on the supporting plate 130, in particular on the surface of the supporting plate 130 which is not coated by layer 135.

In the case of detectors according to the invention having large size, for example greater than 10×10 cm$^2$, optionally greater than 50×50 cm$^2$, operated at high radiation fluxes, i.e. greater than or equal to 10 kHz/cm$^2$, the perimeter connection of the first embodiment of the detector described above would not allow the correct operation of the detector. In fact, at the same surface resistivity, the resistance experienced by the single current pulse diverges with the size of the detector. The detector could therefore not sustain high radiation rates. For this reason, the inventors have designed a second embodiment of the detector according to the invention, illustrated in FIG. 2, having a current evacuation scheme, i.e., a connection to the high voltage power supply system, faster and slightly more sophisticated, compared to that of the perimeter connection.

Figure 2:
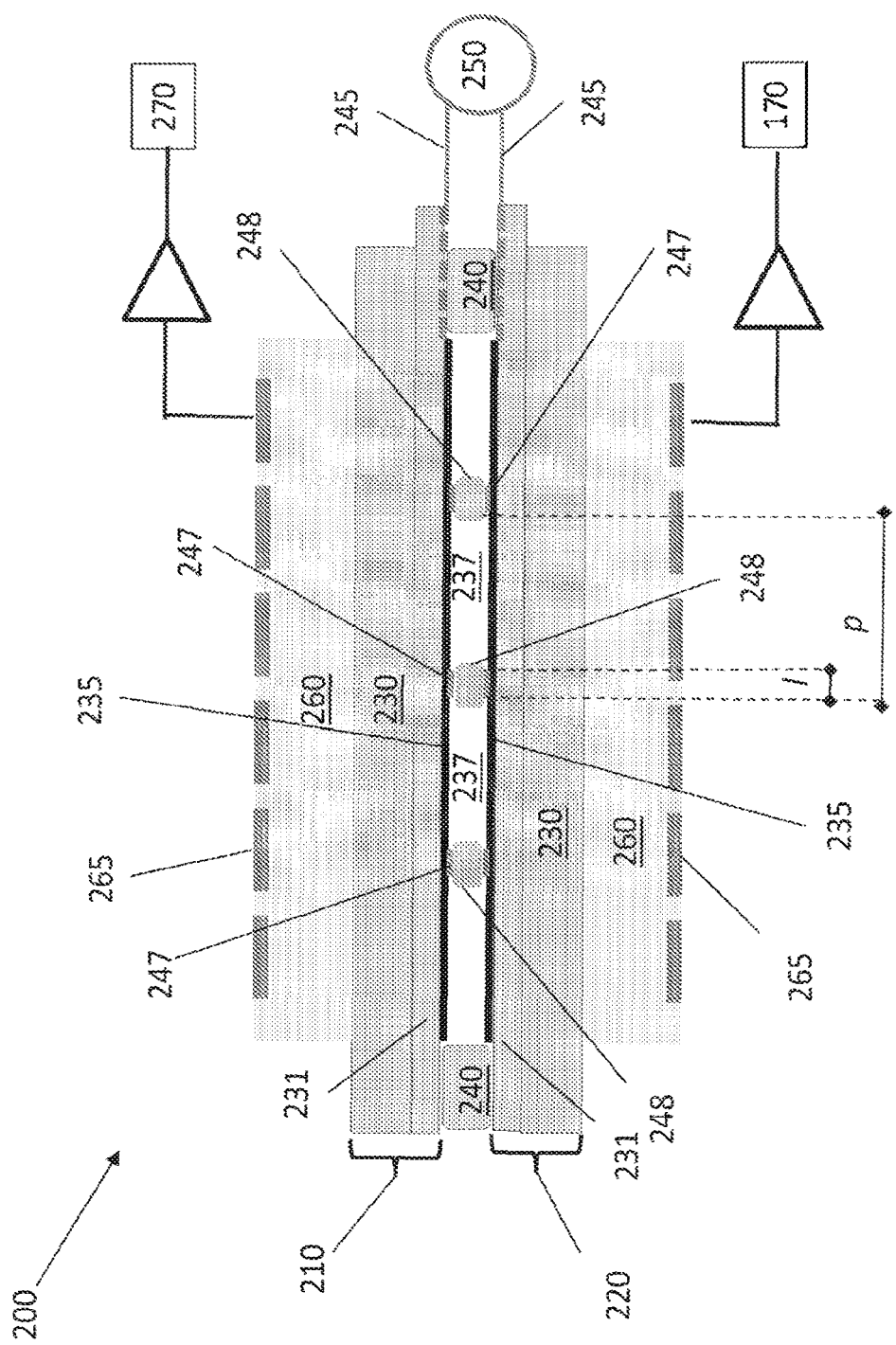
FIG. 2 shows a sectional structure of a second embodiment of a plate electrode detector with modulable surface resistivity according to the invention.

With reference to FIG. 2, the detector 200 comprises a first and a second resistive plate electrodes 210 and 220 coupled parallel to each other on a support frame 240, each comprising a supporting plate 230 coupled to a layer 231 of polymer material, such as for example polyimide, on which a modulable resistivity DLC layer 235 is deposited.

The detector 200 is like the detector 100 of the first embodiment according to the invention wherein, however, the connection assembly 245 to connect to the high voltage power supply 250 also comprises, in addition to the conductive elements connected to at least one perimeter edge of the DLC layer 235, a thin conductive grid 247 which is built on the free surface of the DLC layer 235 of each first and second resistive plate electrode 210, 220. In other words, a thin conductive grid 247 is built on the surface of the DLC layer 235 which faces on the gas gap 237 of each first and second resistive plate electrodes 210, 220. The conductive grid 247, therefore, operates as a distribution network for the high voltage.

Also in this case, the resistive plate electrodes 210, 220 with modulable surface resistivity are the active part of the amplification stage of the detector 200.

The conductive grid 247 is made with an arrangement of thin conductive strips parallel to each other, connected to the outside of the active area to the high voltage power supply. The width/of the strips is between 0.05 mm and 0.2 mm, optionally equal to 0.1 mm, while the pitch p between the strips, i.e., the grid pitch (i.e. the distance between two adjacent parallel conductive strips), is of the order of a few cm, to be adjusted and adapted according to the required high rate performances, optionally included in the range from 5 to 10 cm.

The connection assembly 245, comprising the conductive grid 247, also operates as a current evacuation system.

The arrangement of the electrodes 210, 220 in the detector 200 is such that the grids 247 of the first and second resistive plate electrodes 210, 220 are specular with respect to a plane parallel to the electrodes and passing through the gap 237.

In further embodiments of the present invention, the grid can be made with different arrangements of the conductive strips with respect to the arrangement described above.

The conductive grid 247 can be made with industrial standard screen-printing techniques of conductive pastes. In further embodiments, on the DLC surface facing the gas gap 237, a thin metal layer is previously deposited, optionally with thick from 4 to 5 micrometers, whereby the conductive grid is made by chemical etching on metal. In a preferred embodiment of the invention, the metal is copper and the DLC+Cu layer is made by sputtering technology.

In correspondence of the thin conductive grid 247, inside the gas gap 237, insulating spacers 248 are made by standard technologies of the printed circuit industry, for example with suitable commercial photo-resist. The role of the insulating spacers 248 is twofold: keeping the size of the gap 237 and the isolation of the grid 247, to avoid discharge phenomena within the gas gap 237. The introduced dead zone, considering a width of each insulating spacer 248 on the order from 2 to 3 mm would be less than or at most of the order of 1%. By width we mean the size of the spacer that is parallel to the resistive plate electrode.

The surface of the plate 230 which is not coated by the DLC layer 235 of each resistive plate electrode 210, 220 is coupled to a readout printed circuit 260 on which conductive strips 265 are fixed that are connected to the front-end electronics 270.

In other embodiments of the detector according to the invention, the supporting plate 230 can operate as an external reading electrode, whereby the conductive readout strips 265 are fixed directly on the plate 230, in particular on the surface of the plate 230 which is not coated by the layer 235.

Figure 3:
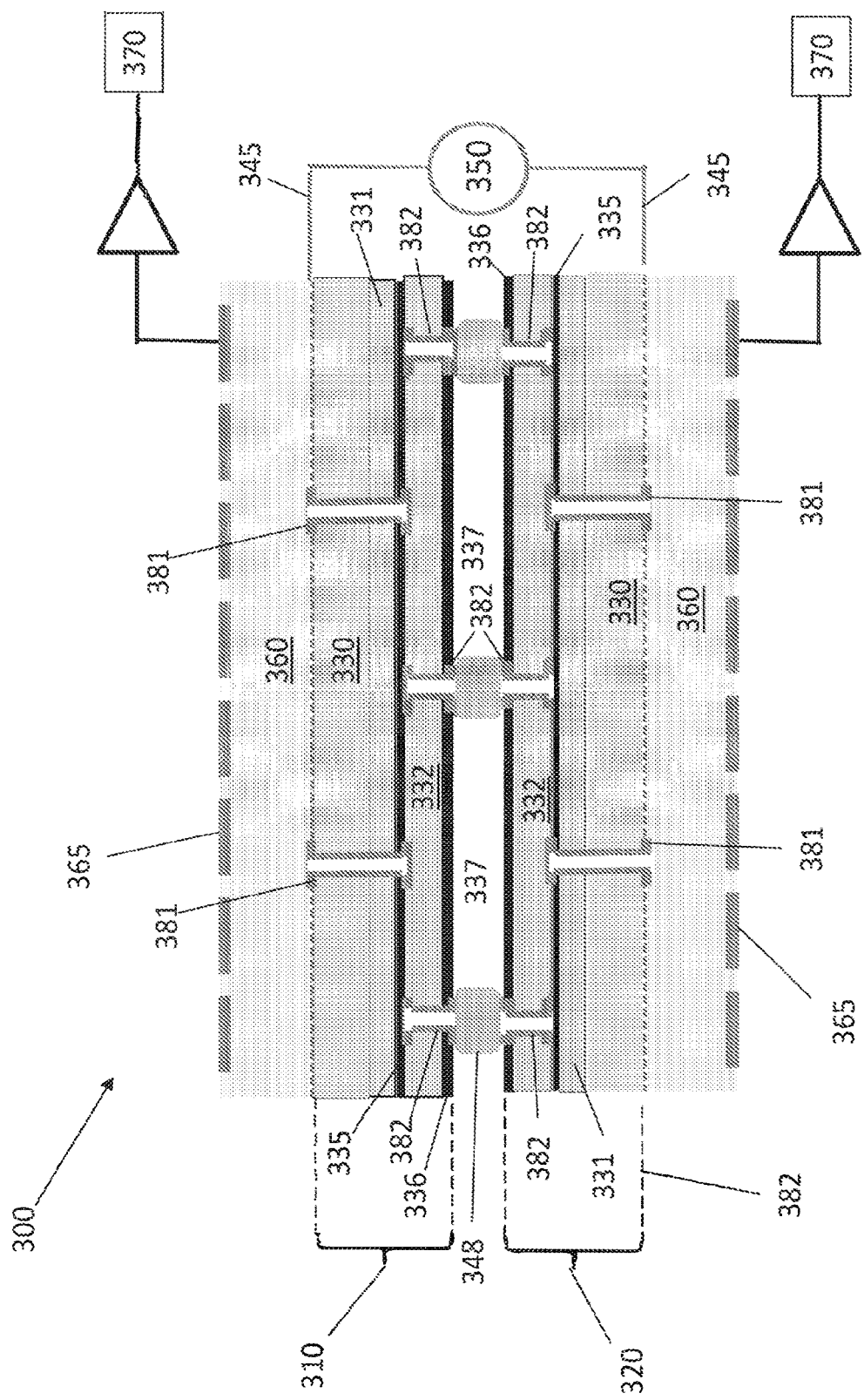
FIG. 3 is a sectional structure of a third embodiment of a plate electrode detector with modulable surface resistivity according to the invention.

A further embodiment of the present invention, designed to operate with large surfaces and high radiation fluxes, i.e., greater than or equal to $10\,kHz/cm^2$, is described below with reference to the structure shown in FIG. 3.

In this third embodiment, like the second embodiment, the resistive plate electrodes 310 and 320 with modulable surface resistivity comprise a resistive double-layer in which two DLC layers are electrically interconnected.

In particular, the detector 300 comprises a first resistive plate electrode 310 and a second resistive plate electrode 320 each comprising a supporting plate 330 on which a first layer 331 of polymer material, such as for example polyimide, is glued. A first modulable resistivity DLC layer 335 is deposited on the free side of the layer 331, i.e., on the side of the first polyimide layer 331 which is opposite the supporting plate 330. A second polyimide layer 332 is coupled to the first DLC layer 335. In other words, the second polyimide layer 332 is directly coupled to the first DLC layer 335.

A second modulable resistivity DLC layer 336 is deposited on the free side of the second layer 332, i.e., on the side which is opposite the first polyimide layer 331, in other words opposite the first DLC layer 335.

The first and second resistive plate electrodes 310, 320 with modulable surface resistivity are coupled parallel to each other on a support frame arranged at the detector perimeter, not shown in the figure, so that the surfaces of the respective second DLC layers 336 which are not facing the respective plates 330, face each other and are kept at a fixed distance forming a gap 337 configured to contain gas.

In further embodiments, the support frame can be semi-rigid.

The first DLC layer 335 is connected to the connection assembly 345 to connect to the high voltage power supply 350 through a first conductive matrix 381 of interconnected metallized vias that go through both the first supporting plate 330 and the first layer 331 of polyimide.

The connection assembly 345 comprises conductive elements positioned on the surface of the supporting plate 330 facing the readout printed circuit 360, in other words on the surface opposite the surface on which the first DLC layer 335 is deposited. These conductive elements of the connection assembly 345 are in electric contact with the vias of the first conductive matrix 381.

The second DLC layer 336 is, in turn, electrically interconnected to the first DLC layer 335, by means of a second conductive matrix 382 of interconnected metallized vias.

The vias of the first and second conductive matrix 381, 382, therefore, operate as a distribution network for high voltage.

The connection assembly 345 and the vias matrices 381, 382 have the dual function of providing a way of rapid evacuation of the current generated by the passage of the radiation in the gas gap 337 and of polarization of the first DLC layers 335 and of the second DLC layers 336 which, being in direct contact with the gas gap, operate as a resistive plate electrode of the detector.

The pitch of the vias is of the order of a few cm and allows to achieve rate capabilities greater than $10\,kHz/cm^2$, while keeping a very high detector stability. In correspondence with the vias of the second conductive matrix 382, inside the gas gap 337 of the detector, photo-resist insulating spacers 348 are built which have the function of keeping the size of the gap and of isolating the grid, in order to avoid discharge phenomena within the gas gap. Optionally, the photo-resist insulating spacers 348 have the shape of discs with a diameter on the order from 2 to 3 mm thus introducing a negligible dead zone, as described above.

The arrangement of the electrodes 310, 320 in detector 300 is such that the first and second matrices 381, 382 of the first and second resistive plate electrodes 310, 320 are specular with respect to a plane being parallel to the electrodes and passing through the gap 337.

The surface of the plate 330 which is not coated by the DLC layer 335 of each resistive plate electrode 310, 320 is coupled to a readout printed circuit 360 on which readout conductive strips 365 are fixed connected to the front-end electronics 370.

Also in this case, the resistive plate electrodes 310, 320 with modulable surface resistivity are the active part of the amplification stage of the detector 300.

In a further embodiment of a resistive plate electrode according to the invention, the resistive plate electrode has a single conductive layer, similarly to the resistive plate electrode 110 (120) of the first embodiment of the detector 100 according to the invention described above and shown in FIG. 1, wherein the connection of the DLC layer to the connection assembly is made by means of a conductive matrix of metallized vias similarly to the connection by means of the first conductive matrix 381 of metallized vias of the first DLC layer 335 to the connection assembly 345 of the third embodiment of detector 300 according to the invention described above and shown in FIG. 3

In still further embodiments of the invention, the resistive plate electrode with modulable surface resistivity is a multi-layer electrode, i.e., comprising a plurality of resistive layers wherein the plurality of DLC layers is electrically interconnected by means of a plurality of conductive matrices of metallized vias.

In other embodiments of the invention, the supporting plate and the readout printed circuit are semi-rigid, in other words flexible, therefore configured to make cylindrical detectors. For example, the supporting plate and the readout printed circuit can comprise plastic materials, such as for example polyimide.

For the purposes of the present invention, a resistive plate electrode means a resistive electrode (110,120; 210,220; 310,320) whose surface, configured to face the gas gap, is flat and homogeneous, that is, it is free of discontinuity elements or microstructures.

The detector according to the invention is made using SBU procedures, Sequential Build Up, that are standard in the rigid-flexible printed circuit industry. In particular, the resistive plate electrode of the present invention is made with industrial techniques of DLC sputtering on polyimide layers.

The insulating spacers defining the gas gap within the detector are an advantageous mechanical component for large area detectors and can comprise materials and by technologies normally used in the processing of printed circuits.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. A resistive plate electrode gas detector comprising a first resistive plate electrode and a second resistive plate electrode that are configured to be biased through an high voltage power supply and each one is configured to be connected to a front-end electronics, wherein the first and the second resistive plate electrode are coupled parallel each other so that the resistive surfaces of each of them are faced each other defining a gas gap configured to contain gas, wherein the first and the second resistive plate electrode are each one a resistive plate electrode comprising a supporting plate coupled to a layer of polymer material on which a DLC layer is deposited that is connected to a connection assembly configured to be connected to a high voltage power supply, wherein the resistive plate electrode has a surface resistivity that is modulable on varying values of one or more deposition parameters of the DLC layer.

2. The resistive plate electrode gas detector according to claim 1 wherein the first or second resistive plate electrode has a surface resistivity ranging from 0.1 to 10 GΩ/square.

3. The resistive plate electrode gas detector according to claim 1, wherein the layer of polymer material comprises a polyimide foil.

4. The resistive plate electrode gas detector according to claim 1, wherein the supporting plate comprises glass fibres reinforced epoxy resin.

5. The resistive plate electrode gas detector according to claim 1, wherein the connection assembly comprises conductive elements that are connected to at least one perimetral edge of the DLC layer.

6. The resistive plate electrode gas detector according to claim 1, wherein the connection assembly comprises a conductive grid made on a free surface of the DLC layer.

7. The resistive plate electrode gas detector according to claim 6, wherein the conductive grid is an array of conductive strips that are parallel each other.

8. The resistive plate electrode gas detector according to claim 7, wherein said parallel conductive strips have a width in the range of 0.05 mm-0.2 mm and a pitch in the range of centimeter.

9. The resistive plate electrode gas detector according to claim 8, wherein said parallel conductive strips have a pitch ranging from 5 to 10 cm.

10. The resistive plate electrode gas detector according to claim 1, wherein the DLC layer is connected to the connection assembly by means of a matrix of metalized vias passing through the supporting plate and the layer of polyimide, the connection assembly comprising conductive elements located on the surface of supporting plate that is opposed to the surface on which the DLC layer is deposited.

11. The resistive plate electrode gas detector according to claim 10, further comprising an additional layer of polymer material on which an additional DLC layer is deposited that is connected to said DLC layer by means of an additional matrix of vias.

12. The resistive plate electrode gas detector according to claim 1, comprising insulating spacers inside the gap configured to preserve the scale of the gas gap and avoid discharge occurrences inside the gas gap.

13. The resistive plate electrode gas detector according to claim 1, wherein each of said first and second resistive plate electrode is coupled to a readout printed circuit board on which readout conductive strips connected to the front-end electronics are fixed.

14. The resistive plate electrode gas detector according to claim 1, wherein the supporting plate is semi-rigid, in other words flexible.

15. The resistive plate electrode gas detector according to claim 1, wherein the supporting plate comprises plastic materials.

* * * * *